(12) United States Patent
So et al.

(10) Patent No.: US 7,637,445 B2
(45) Date of Patent: Dec. 29, 2009

(54) FOOD CUTTING DEVICE

(75) Inventors: Kwok Kuen So, 2nd Floor, Chuan Yuan Factory Building, 342-344 Kwun Tong Road, Kwun Tong, Kowloon, Hong Kong (HK); Yiu Chung Wan, Hong Kong (CN); Clive Koon Yin Wong, San Leandro, CA (US); Willard Wing Yin Wong, San Leandro, CA (US)

(73) Assignee: Kwok Kuen So, Hong Kong (HK)

( * ) Notice: Subject to any disclaimer, the term of this patent is extended or adjusted under 35 U.S.C. 154(b) by 34 days.

(21) Appl. No.: 11/752,992

(22) Filed: May 24, 2007

(65) Prior Publication Data

US 2008/0017737 A1 Jan. 24, 2008

(30) Foreign Application Priority Data

Jul. 21, 2006 (EP) .................................. 06253830

(51) Int. Cl.
*A47J 43/25* (2006.01)
(52) U.S. Cl. ...................................... 241/93; 241/169.1
(58) Field of Classification Search ................... 241/93, 241/169.1
See application file for complete search history.

(56) References Cited

U.S. PATENT DOCUMENTS

| | | | | |
|---|---|---|---|---|
| 4,374,574 A | * | 2/1983 | David ..................... | 241/169.1 |
| 5,364,037 A | * | 11/1994 | Bigelow ..................... | 241/93 |
| 5,680,997 A | * | 10/1997 | Hedrington .................. | 241/93 |
| 6,409,107 B1 | | 6/2002 | Romano | |
| 6,616,076 B2 | * | 9/2003 | Wong .......................... | 241/168 |
| 6,644,179 B1 | | 11/2003 | Kichm | |
| 6,915,973 B2 | * | 7/2005 | So ........................... | 241/169.1 |
| 2003/0034409 A1 | | 2/2003 | Wong | |
| 2005/0082401 A1 | | 4/2005 | Takayama et al. | |

* cited by examiner

*Primary Examiner*—Mark Rosenbaum
(74) *Attorney, Agent, or Firm*—Leydig, Voit & Mayer, Ltd.

(57) ABSTRACT

A food cutting device for cutting food items into smaller pieces, comprises a receptacle having an entrance though which food items can be introduced into the receptacle and an exit though which smaller pieces of the food items can be dispensed from the receptacle, a rotary cutter in the receptacle for cutting the food items into the smaller pieces, and a handle connected with the receptacle, for holding and carrying the food cutting device with only one hand of a user. A driving mechanism is located between the cutter and the handle for manual operation by the user to operate the cutter, including an operating member that is located at or adjacent to the handle for movement and operation by the hand holding and carrying the food cutting device.

16 Claims, 7 Drawing Sheets

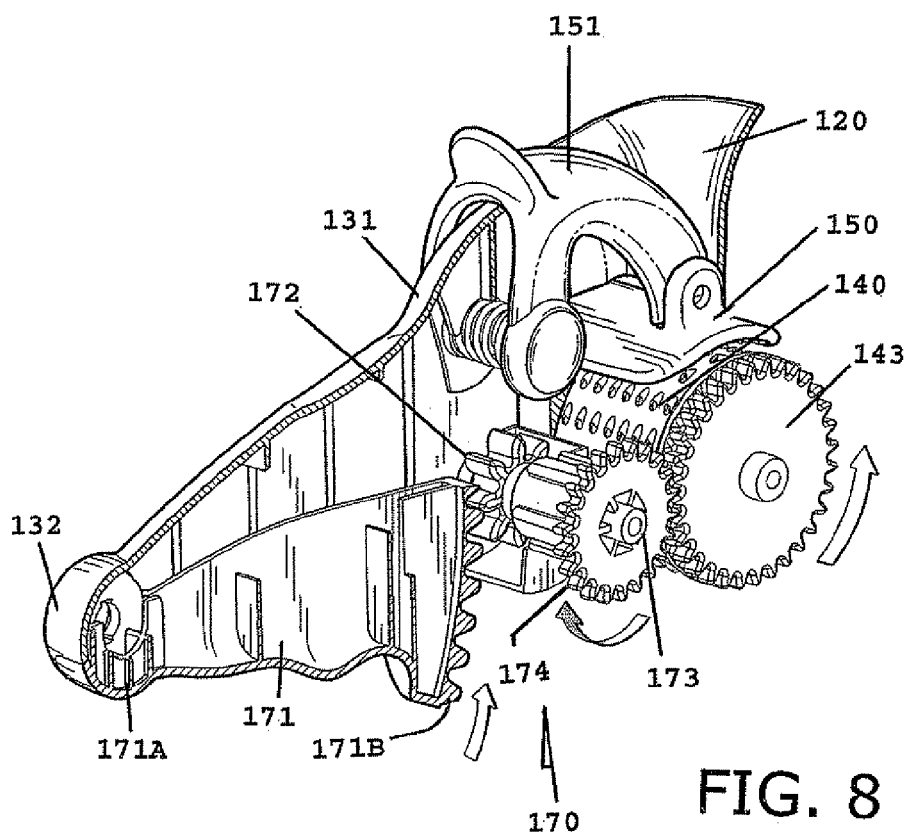
FIG. 8
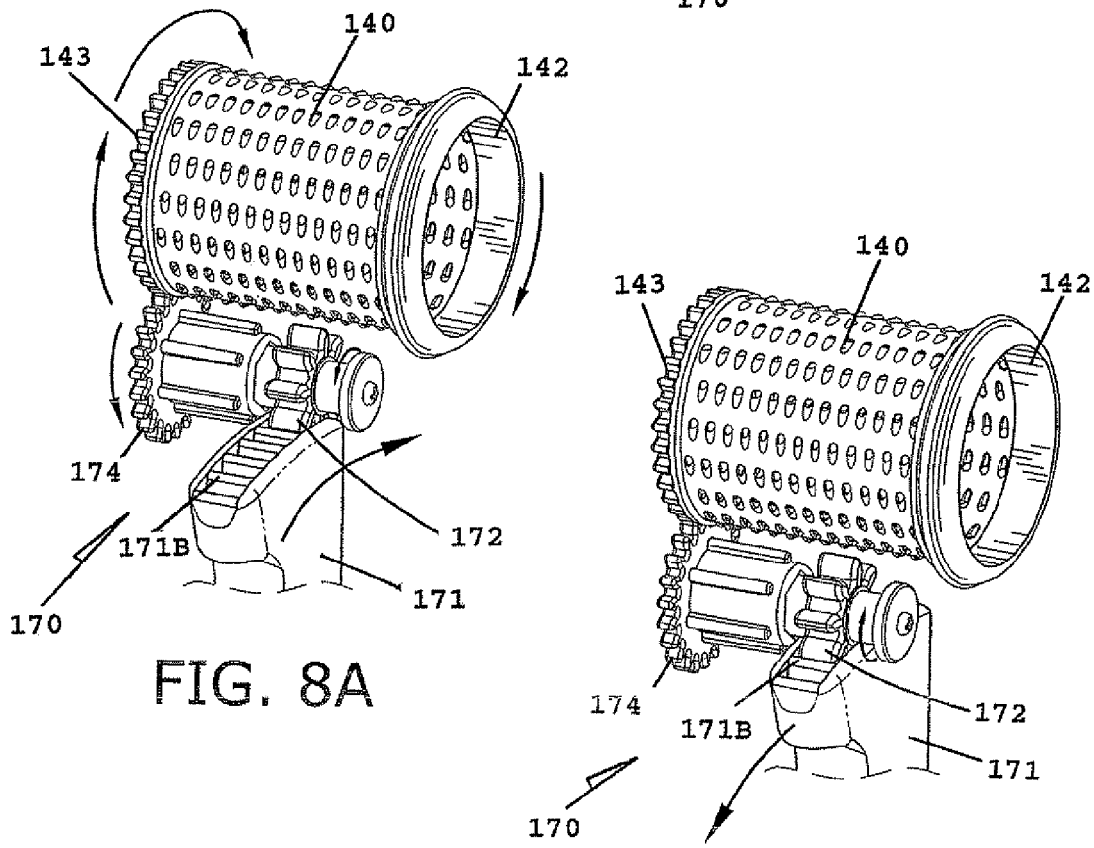
FIG. 8A
FIG. 8B

FOOD CUTTING DEVICE

The present invention relates to a cutting device for cutting food.

BACKGROUND OF THE INVENTION

More particularly, but not exclusively, the invention is concerned with a hand-held device for use in the kitchen for cutting food into smaller pieces, namely grating solid food items such as cheese or carrots and/or julienning lighter food such as parsley or other vegetables, for example.

Cheese graters having a hand-held hopper, a presser and a manually rotated grating drum are generally known, in that the hopper delivers cheese blocks to the grating drum, which is rotated within a barrel by a crank handle. A relatively larger handle extending from the barrel is gripped by the left hand of a user for holding the cheese grater, who turns the crank handle by his/her right hand.

The invention seeks to provide a new or otherwise improved food cutting device which is more convenient to use.

SUMMARY OF THE INVENTION

According to the invention, there is provided a food cutting device for cutting food items into smaller pieces, comprising a receptacle having an entrance through which said food items can be introduced into the receptacle and an exit through which said smaller pieces can be dispensed from the receptacle, a rotary cutter provided in the receptacle for cutting said food items into said smaller pieces, and a handle connected with the receptacle, by means of which the overall food cutting device can be held and carried by only one hand of a user. A driving mechanism is provided between the cutter and the handle for manual operation by said user to operate the cutter, including an operating member that is located at or adjacent to the handle for movement and hence operation by the same said one hand holding and carrying the overall food cutting device.

Preferably, the operating member is supported for movement in opposite directions.

More preferably, the operating member is hinged for pivotal movement in said opposite directions.

Further more preferably, the handle has a first part connected with the receptacle and a second part which is distal from the first part and to which the operating member is hinged.

Yet further more preferably, the handle is elongate, having a first end as the first part connected with the receptacle and an opposite second end as the second part to which the operating member is hinged.

In a preferred embodiment, the operating member is movable in a first direction to cause the driving mechanism to operate the cutter and in a second direction opposite to the first direction whereby the driving mechanism skips the cutter.

More preferably, the operating member is movable towards the handle in the first direction and outwardly from the handle in the second direction.

More preferably, the food cutting device includes a spring resiliently biasing the operating member in the second direction.

More preferably, the driving mechanism includes a one-way clutch for transmitting drive to the cutter upon movement of the operating member in the first direction and interrupting transmission of drive to the cutter upon movement of the operating member in the second direction.

Further more preferably, the clutch comprises two gear members having respective teeth interengaged under the action of a spring member for simultaneous rotation to transmit drive to the cutter upon movement of the operating member in the first direction, the teeth being skewed for disengagement against the action of the spring member to interrupt drive to the cutter upon movement of the operating member in the second direction.

It is preferred that the driving mechanism includes a train of gears for drive transmission and speed reduction to increase torque transmitted to the cutter.

It is preferred that the cutter comprises a cylindrical hollow body having cutting apertures through its wall for cutting said food items into smaller pieces.

It is further preferred that the food cutting device includes a presser for pressing said food items against the cutter for cutting thereby.

It is yet further preferred that the presser is hinged for pivotal movement in one direction to press said food items against the cutter and in an opposite direction to expose the cutter.

Preferably, the food cutting device further includes a spring element resiliently biasing the presser towards the cutter.

It is preferred that the food cutting device includes a retainer for retaining the cutter in the receptacle.

It is further preferred that the retainer comprises a spring-loaded latch.

BRIEF DESCRIPTION OF DRAWINGS

The invention will now be more particularly described, by way of example only, with reference to the accompanying drawings, characterized in that:

FIG. 8 is a partially cutaway right side perspective view of the food grater of FIG. 7, illustrating the operation of the driving mechanism;

FIG. 8A is a part of FIG. 8 taken on the left side, showing the driving mechanism operating in a driving direction turning the cutter;

FIG. 8B is a perspective view similar to FIG. 8A, showing the operation of the driving mechanism operating in the reverse direction skipping the cutter;

BRIEF DESCRIPTION OF PREFERRED EMBODIMENT

Figure 1:
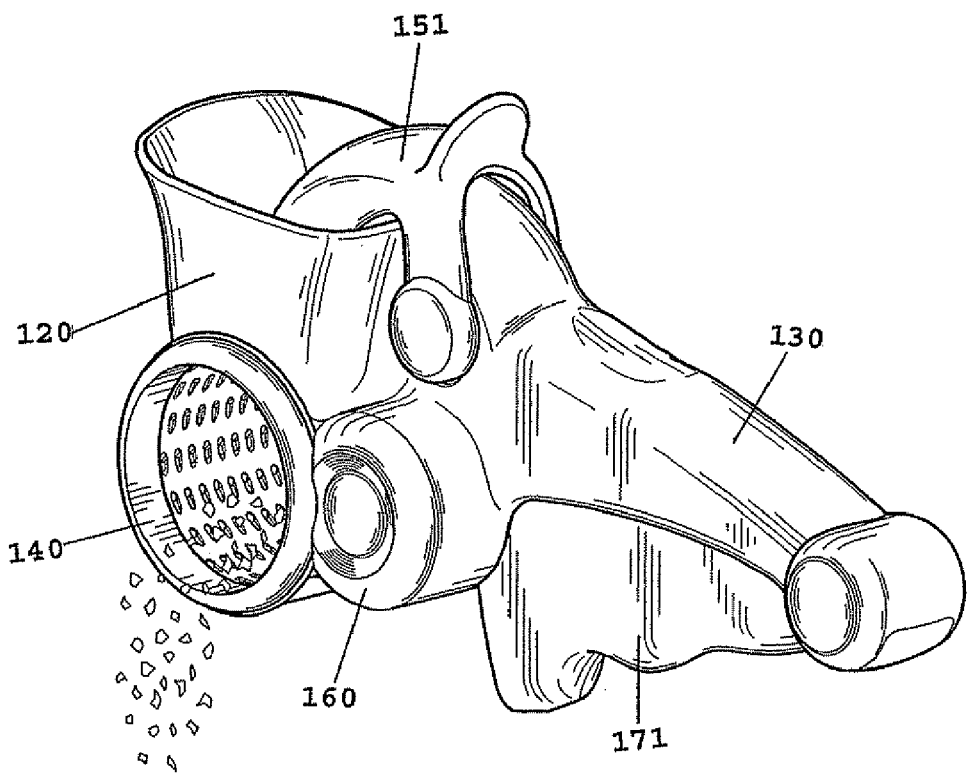
FIG. 1 is a rear perspective view of a food cutting device, in the form of a food grater, in accordance with the invention.
Figure 2:
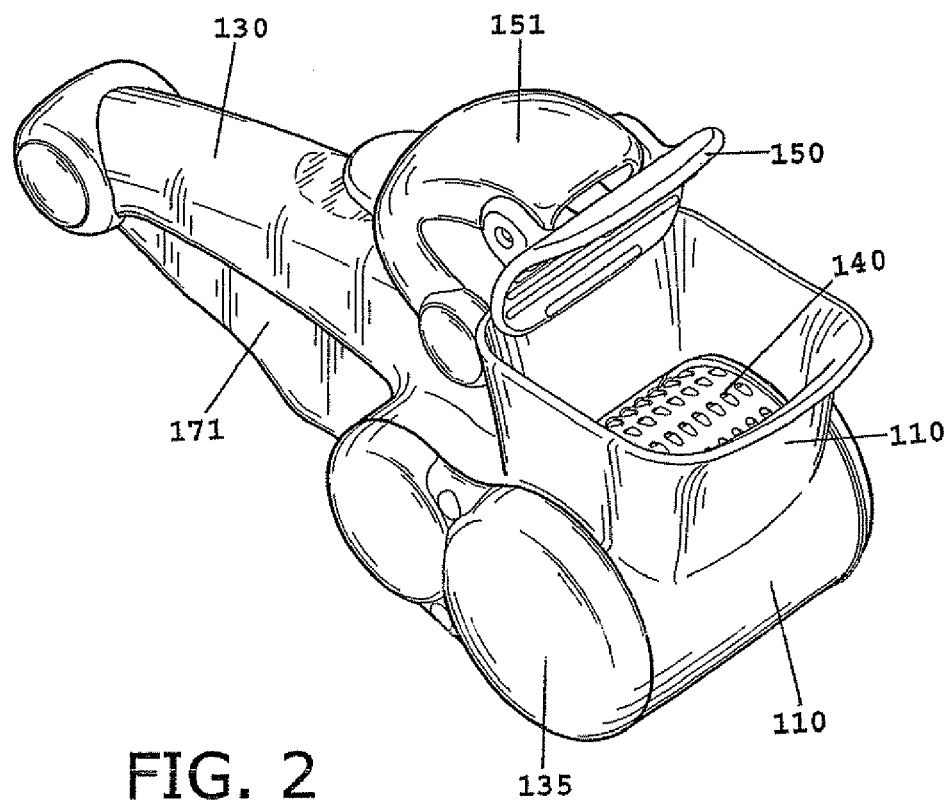
FIG. 2 is a front perspective view of the food grater of FIG. 1.
Figure 3:
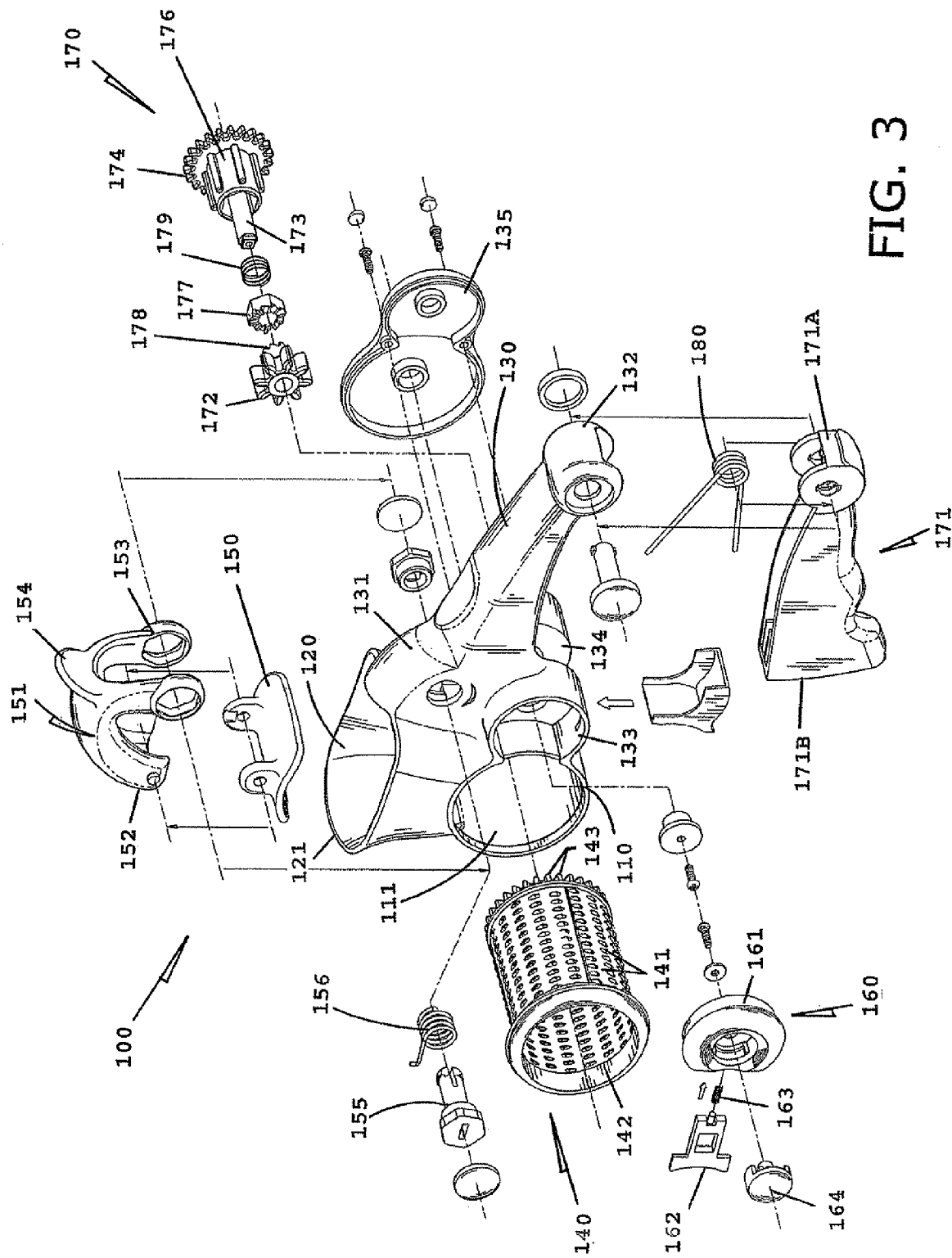
FIG. 3 is an exploded rear perspective view of the food grater of FIG. 1.
Figure 4:
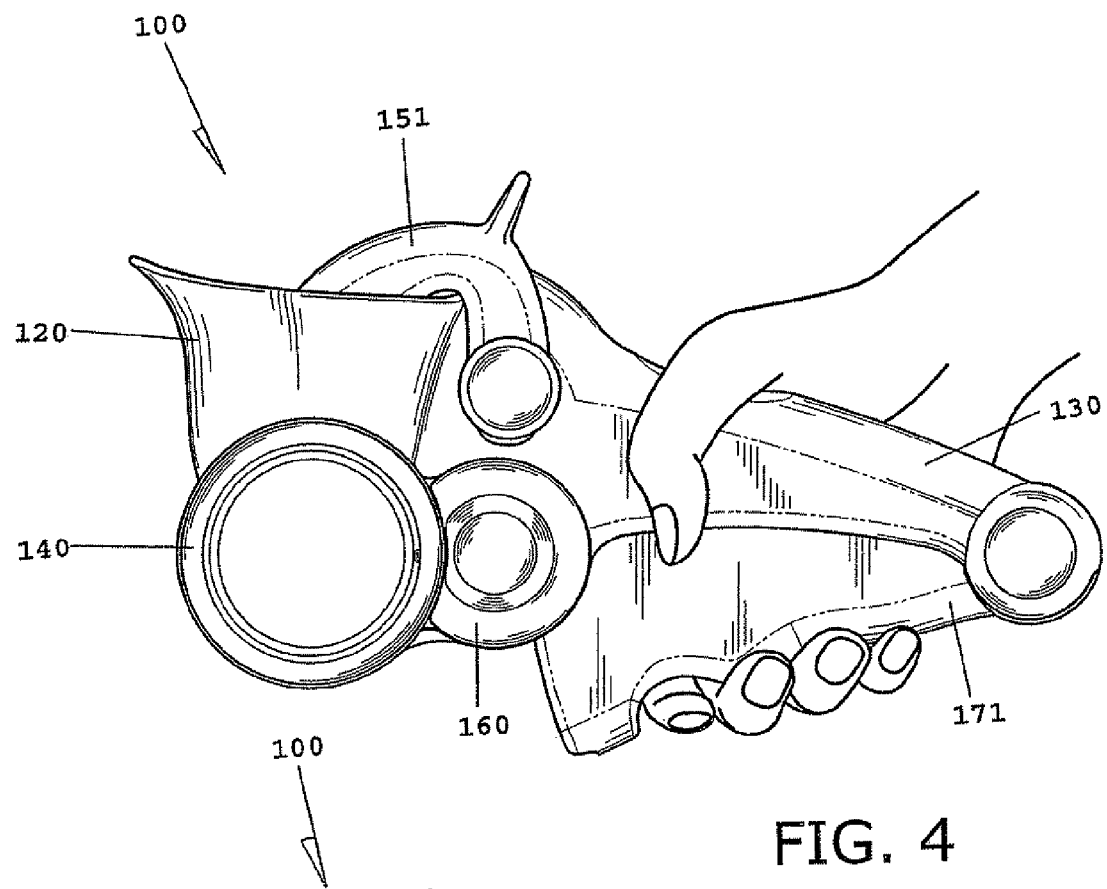
FIG. 4 is a left side view of the food grater of FIG. 1, being gripped by one hand for operation.

Referring to the drawings, there is shown a food cutting device in the form of a hand-held food grater 100 embodying the invention for cutting food items 9, such as cheese or carrot, into smaller pieces 8. The grater 100 has a moulded plastic receptacle having a horizontally-extending barrel 110 and a hopper 120 on the barrel 110, and includes a horizontal handle 130 integrally connected with one side of the barrel 110 and hopper 120. By means of the handle 130, the overall food grater 100 can be held or gripped and carried by only one hand of a user.

Figure 7:
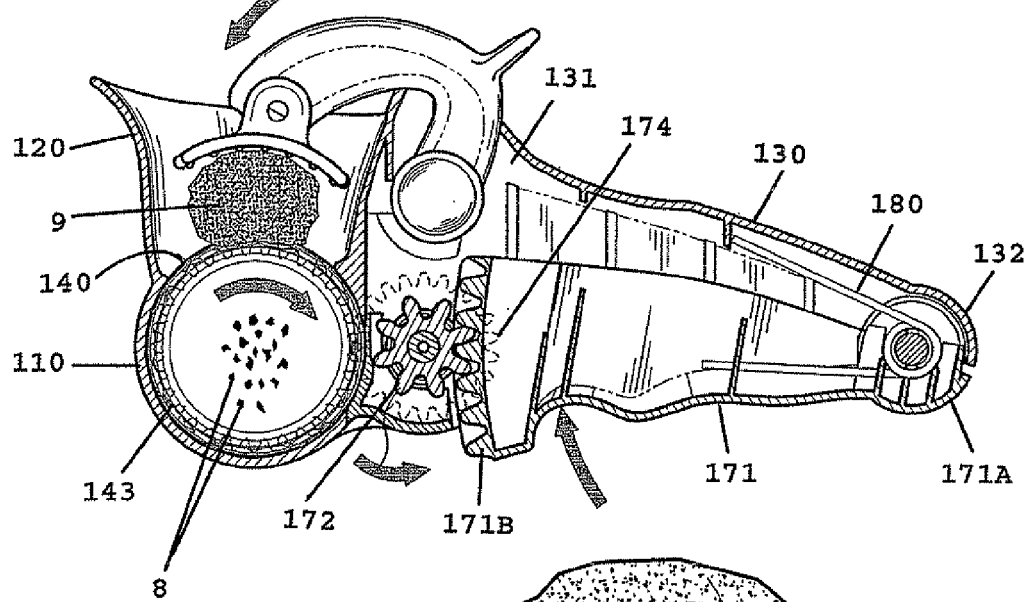
FIG. 7 is a cross-sectional left side view similar to FIG. 6, illustrating a rotary cutter being operated by a manual driving mechanism of the food grater.
Figure 7A:
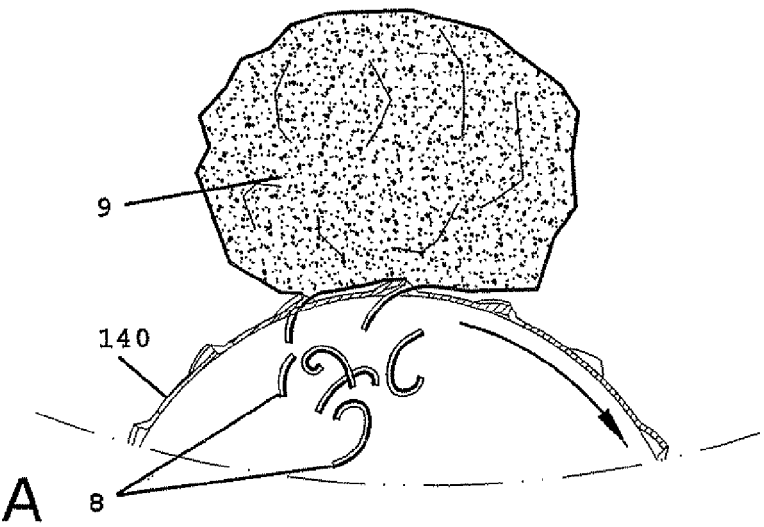
FIG. 7A is a part of FIG. 7 on an enlarged scale, showing the cutter grating a piece of food.

The food grater 100 includes a hollow cylindrical rotary grating drum 140 which has numerous cutting apertures 141 through its stainless steel cylindrical wall for cutting food items 9 into smaller pieces 8 (FIG. 7A). The drum 140 is fitted co-axially inside the barrel 110 and is supported thereby for rotation. The upper side of the drum 140 is exposed through the hopper 120. Food items are to be introduced into the receptacle through an upper opening 121 of the hopper 120, reaching the upper side of the drum 140.

A presser plate 150 fits generally horizontally within the upper opening 121 of the hopper 120 for pressing the food items 9 downwardly against the grating drum 140 for cutting thereby. The presser plate 150 is supported by an arcuate carrier 151 whose front end 152 is hinged to the presser plate 151 and whose rear end 153 is hinged to a near end 131 of the handle 130, for pivotal movement in a forward direction into the hopper 120 to press the food items 9 in the hopper 120 against the drum 140 and in the backward direction to expose the interior of the hopper 120 or the drum 140.

Figure 5:
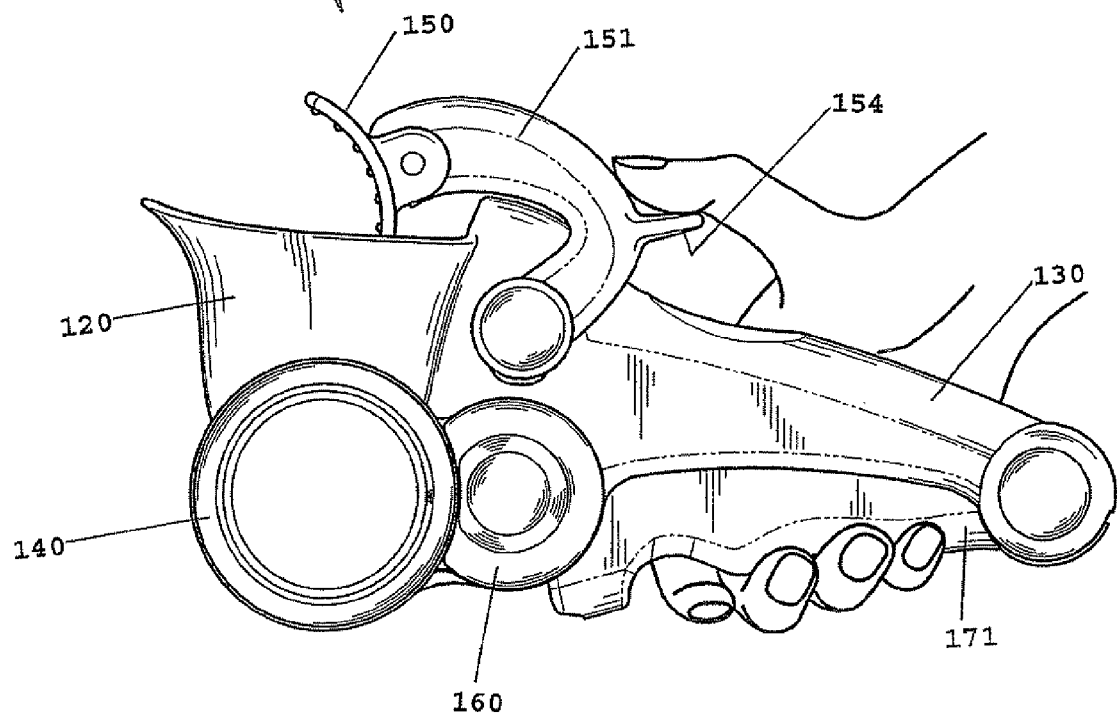
FIG. 5 is a left side view similar to FIG. 4, showing a presser of the food grater being lifted by the thumb.
Figure 6:
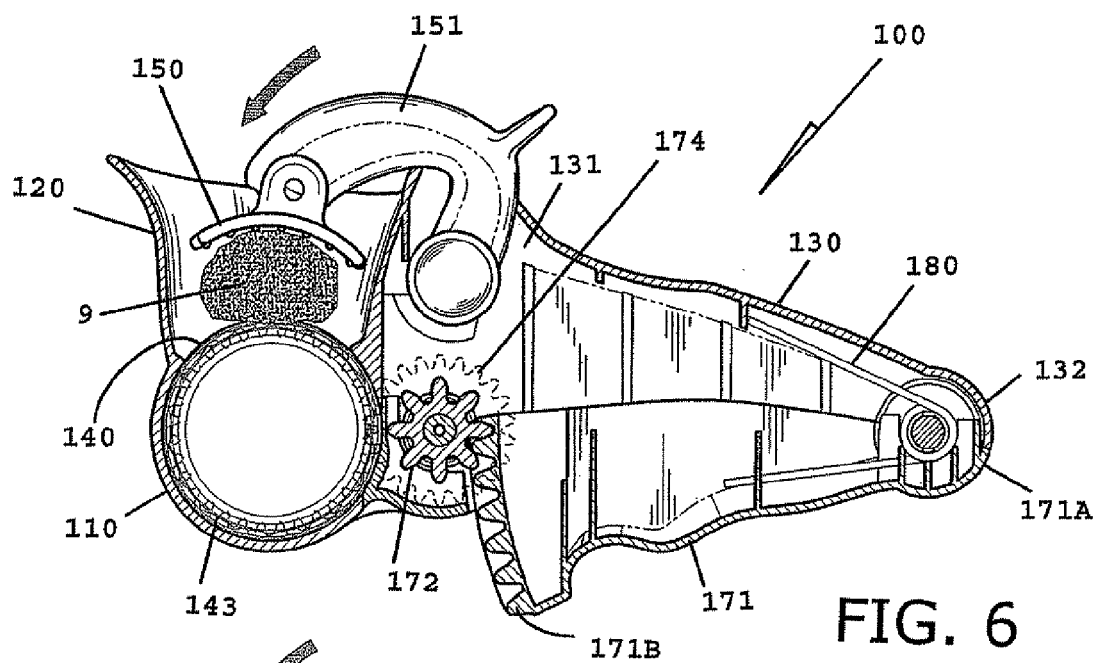
FIG. 6 is a cross-sectional left side view of the food grater of FIG. 5, illustrating the operation of the presser.

A hinge pin 155 extending horizontally through the rear carrier end 153 and the near handle end 131 pivotably connects the carrier 151 to the handle 130. Inside the handle 130, a torsion coil spring 156 disposed on the pin 155 resiliently biases the presser plate 150 into the hopper 120 towards (and against) the grating drum 140. By engaging an upper tab 154 of the carrier 151 with the thumb of the hand gripping the handle 130, the user can pivot the carrier 151 back against the spring 156 to thereby lift the presser plate 150 (FIG. 5) for loading food items into the hopper 120.

The barrel 110 has an end opening 111 on its left side, with which an open left end 142 of the grating drum 140 coincides. Food items 9 in the hopper 120 are cut by the drum 140 into small pieces 8 which then enter the drum 140 through the cutting apertures 141 thereof and are dispensed through the open drum end 142 i.e. the barrel opening 111. The right end of the drum 140 is closed, on and over which a gearwheel 143 is fixed.

There is a pair of flat cylindrical chambers 133 and 134 located vertically on opposite left and right sides immediately underneath the near end 131 of the handle 130, adjoining the barrel 110. The chambers 133 and 134 house, respectively, a latch 160 for retaining the grating drum 140 in the barrel 110 and a driving mechanism 170 for rotating the drum 140.

The latch 160 has a generally circular body 161 that is mounted across the opening of the left chamber 133, and a latching member 162 supported by the body 161 for extending laterally slightly into the barrel opening 111 and engaging the grating drum 140 by its open end 142. An internal compressing coil spring 163 resiliently biases the latching member 162 outwardly into engagement with the drum 140. A press knob 164 located in the centre of the body 161 has an inclined cam surface 165 for, upon depression, withdrawing the spring-loaded latching member 162 to release the drum 140 for cleaning or replacement with another drum having different cutting (or slicing) apertures.

The driving mechanism 170 is provided between the grating drum 140 and the handle 130 for manual operation by the user to operate the drum 140. The driving mechanism 170 has an operating member 171 located at or adjacent to or more specifically alongside underneath the handle 130, which has a flat elongate body received partially within the handle 130, for movement and hence operation by the same hand of the user holding and carrying the overall food grater 100.

The operating member 171 has a rear end 171A hinged to a rear end 132 of the handle 130 for limited pivotal movement in opposite directions and a broad front end having an integral toothed rack 171B extending generally upright. The operating member 171 is resiliently biased to pivot outwardly relative to the handle 130 by an internal elbow spring 180 sprung therebetween.

The driving mechanism 170 includes an inner gearwheel 172 rotatably supported on a horizontal shaft 173, an outer gearwheel 174 mounted fast on the shaft 173, and a one-way clutch 175 disposed on the shaft 173 co-axially between the two gearwheels 172 and 174. Most of these components are housed in the right chamber 134. A lid 135 closes the right chamber 134 as well as an adjacent right end of the barrel 110.

The inner gearwheel 172, which is exposed between the two chambers 133 and 134, is engaged by the toothed rack 171B for rotation by the operating member 171 upon pivoting by the user, with the outer gearwheel 174 in mesh with the gearwheel 143 of the grating drum 140 for rotating the drum 140.

The driving force from the inner gearwheel 172 is transmitted to the outer gearwheel 174 via the one-way clutch 175. The clutch 175 has a cylindrical sleeve 176 fixed co-axially to the inner side of the outer gearwheel 174, with the shaft 173 projecting out centrally from the sleeve 176. The clutch 175 includes a pair of interengaging gear members 177 and 178 disposed co-axially side-by-side on the shaft 173.

The first gear member 177 has a hexagonal outer shape and is located within the sleeve 176, which has a matching hexagonal inner cross-section such that the gear member 177 is rotationally engaged with the sleeve 176 and hence the outer gearwheel 174. The gear member 177 is slidable, albeit to a limited extent, along the shaft 173 in opposite directions. It is resiliently biased outwardly by a coil spring 179 on the shaft 173 compressed between the gear member 177 and an inner part of the sleeve 176.

The second gear member 178 is fixed co-axially to the inner side of the inner gearwheel 172, for rotation therewith about the shaft 173.

Figure 9:
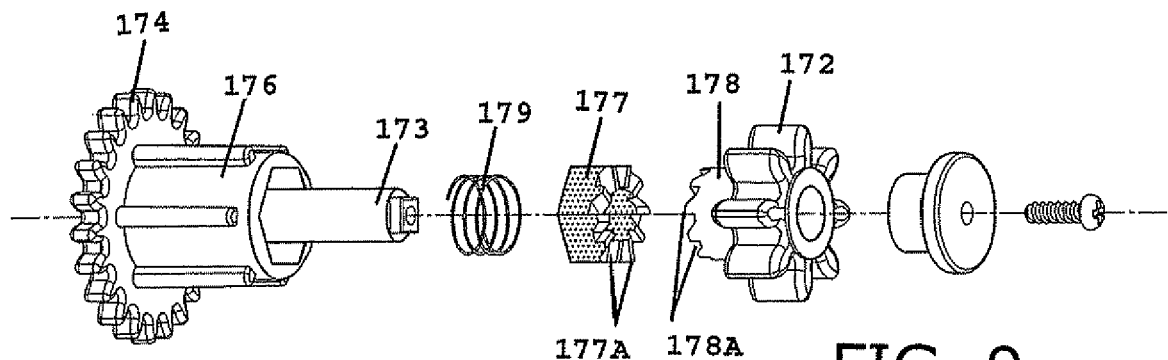
FIG. 9 is an exploded perspective view of parts of the driving mechanism of FIG. 8A or 8B.
Figure 9A:
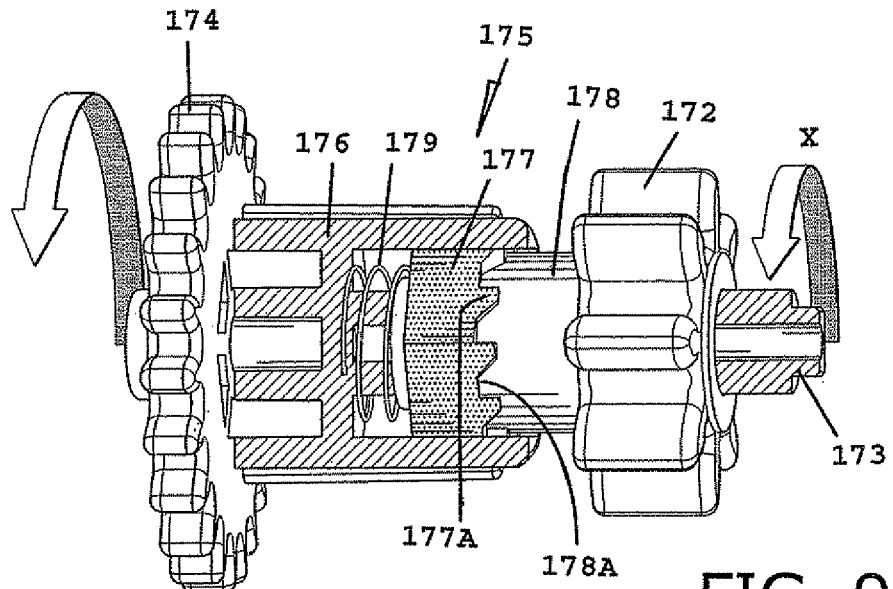
FIG. 9A is an enlarged perspective view of the parts of the driving mechanism of FIG. 9, showing its operation in the driving direction.
Figure 9B:
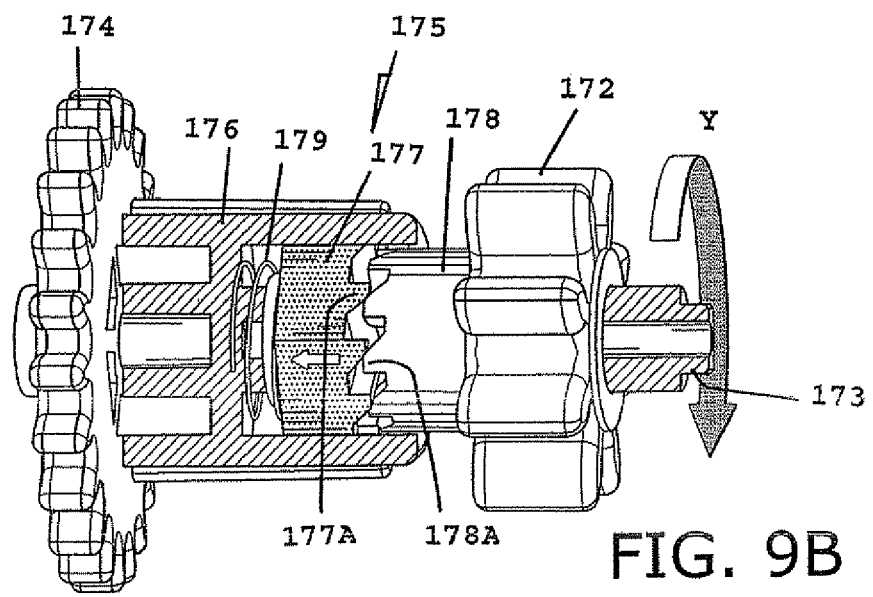
FIG. 9B is similar to FIG. 9A, showing the operation of the parts of the driving mechanism in the reverse direction.
Figure 10:
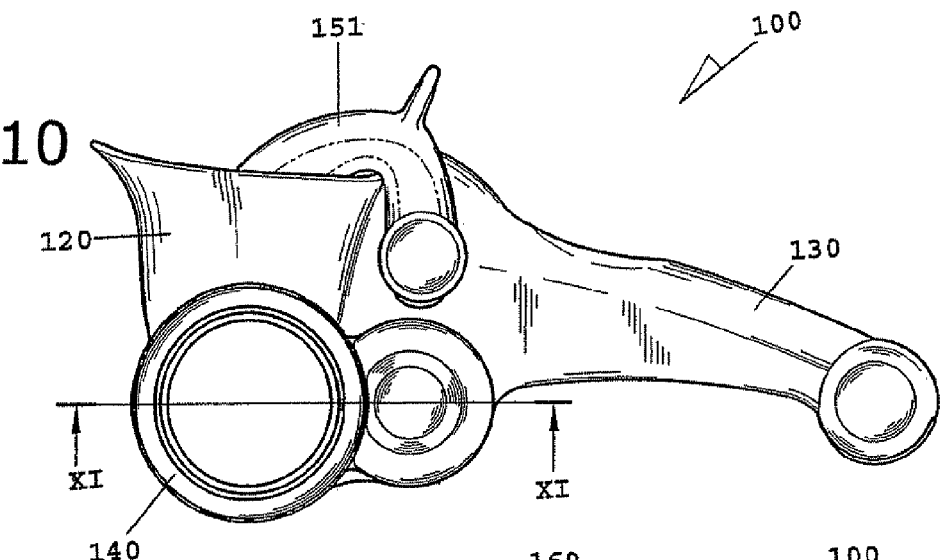
FIG. 10 is a left side view of the food grater of FIG. 1, without a driving mechanism.
Figure 11:
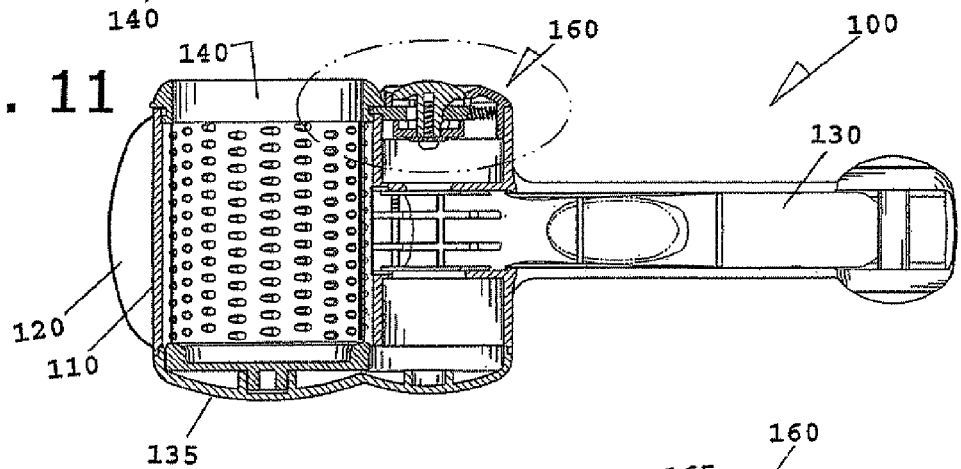
FIG. 11 is a cross-sectional view of the food grater of FIG. 10, taken along line XI-XI.
Figure 11A:
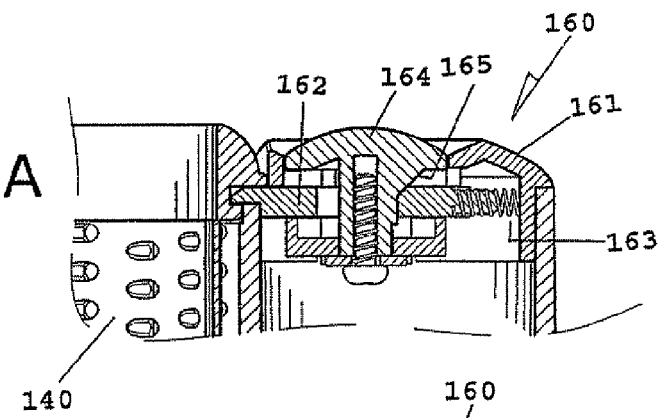
FIG. 11A is a part of FIG. 11 on an enlarged scale, showing a latch holding a rotary cutter of the food grater.
Figure 11B:
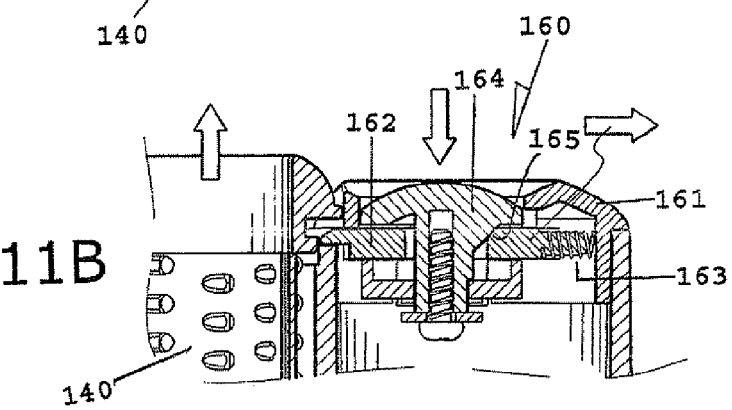
FIG. 11B is similar to FIG. 11A, showing operation of the latch to release the cutter.

The two gear members 177 and 178 are formed with respective sets of teeth 177A and 178A on their confronting sides, which are interengaged under the action of the spring 179 urging the first gear member 177 against the second gear member 178. The teeth 177A and 178A are skewed or asymmetrical such that the first gear member 177 will be engaged and hence rotated by the second gear member 178 when the inner gearwheel 172 is rotated in one, driving direction X (FIG. 9A), and that the first gear member 177 will be disengaged and skipped by the second gear member 178, and hence stops rotation, when the inner gearwheel 172 is rotated in the opposite, non-driving direction Y (FIG. 9B).

The inner gearwheel 172 will be turned in the driving direction X by the operating member 171 when the latter is pivoted into the handle 130, upon being squeezed by the hand of the user gripping the handle 130. When this happens, the first gear member 177 is engaged and thus driven by the second gear member 178 for simultaneous rotation to transmit the rotational drive to the outer gearwheel 174 and hence the grating drum 140 for operation.

The inner gearwheel 172 will be turned in the non-driving direction Y by the operating member 171 when the latter is released to pivot outwardly from the handle 130 under the action of the elbow spring 180. When this happens, the first gear member 177 is disengaged and thus skipped by the second gear member 178, whereby the transmission of drive is interrupted and the grating drum 140 will be skipped and not be reversely rotated.

The inner gearwheel 172 has considerably less teeth than the outer gearwheel 174, which in turn has considerably less teeth than the gearwheel 143 of the grating drum 140, thereby together constituting a speed-reduction train of gears for drive transmission to increase torque transmitted to the drum 140.

One hand operation is made possible with the food cutting device of the present invention, in that the same hand of a user holding and carrying the device by its handle can also operate the rotary cutter simultaneously. This renders the use of the subject food cutting device very conveniently. In a different aspect, the food cutting device can be used by either right-handed or left-handed users, whereby left-handed persons are not prejudiced and production does not need to cater for a left-hand version.

It is envisaged that the subject food cutting device can take any suitable form for cutting food (of a different nature) through a cutting operation that is not grating or slicing, such as a parsley mincer that incorporates a set of radially-extending rotary cutting blades cutting through slots of a stationary anvil.

The invention has been given by way of example only, and various other modifications of and/or alterations to the described embodiment may be made by persons skilled in the art without departing from the scope of the invention as specified in the appended claims.

What is claimed is:

1. A food cutting device for cutting food items into smaller pieces, comprising:
   a receptacle having an entrance through which food items can be introduced into the receptacle and an exit through which smaller pieces of the food items can be dispensed from the receptacle;
   a rotary cutter comprising a cylindrical hollow body having a wall and cutting apertures passing through the wall for cutting the food items into the smaller pieces, the rotary cutter being located in the receptacle for cutting the food items into the smaller pieces;
   a handle connected to the receptacle, for holding and carrying of the food cutting device with only one hand of a user;
   a presser hingedly joined to the receptacle for pivotal movement between a first direction pressing food items against the cutter and a second direction, opposite the first direction, exposing the cutter;
   a spring element resiliently biasing the presser in the first direction, towards the cutter; and
   a driving mechanism located between the cutter and the handle for manual operation by the user to operate the cutter, including an operating member that is located at the handle for movement and operation by the one hand holding and carrying the food cutting device, wherein
   the operating member is hinged for pivotal movement in opposite directions,
   the handle has a first part connected with the receptacle and a second part which is distal from the first part and to which the operating member is hinged, and
   the handle is elongate, has a first end as the first part connected with the receptacle, and has a second end, opposite the first end, as the second part to which the operating member is hinged.

2. The food cutting device as claimed in claim 1, including a retainer retaining the cutter in the receptacle.

3. A food cutting device for cutting food items into smaller pieces, comprising:
   a receptacle having an entrance through which food items can be introduced into the receptacle and an exit through which smaller pieces of the food items can be dispensed from the receptacle;
   a rotary cutter comprising a cylindrical hollow body having a wall and cutting apertures passing through the wall for cutting the food items into the smaller pieces, the rotary cutter being located in the receptacle for cutting the food items into the smaller pieces;
   a handle connected to the receptacle, for holding and carrying of the food cutting device with only one hand of a user;
   a presser hingedly joined to the receptacle for pivotal movement between a first direction pressing food items against the cutter and a second direction, opposite the first direction, exposing the cutter;
   a spring element resiliently biasing the presser in the first direction, towards the cutter; and
   a driving mechanism located between the cutter and the handle for manual operation by the user to operate the cutter, including an operating member that is located at the handle for movement and operation by the one hand holding and carrying the food cutting device, wherein the operating member is movable in a driving direction to cause the driving mechanism to operate the cutter, and in a non-driving direction, opposite to the driving direction, in which the driving mechanism skips the cutter.

4. The food cutting device as claimed in claim 3, wherein the operating member is movable towards the handle in the driving direction and outwardly from the handle in the non-driving direction.

5. The food cutting device as claimed in claim 3, including a spring resiliently biasing the operating member towards the non-driving direction.

6. The food cutting device as claimed in claim 3, wherein the driving mechanism includes a one-way clutch for transmitting a driving force to the cutter upon movement of the operating member in the driving direction and interrupting transmission of the driving force to the cutter upon movement of the operating member in the non-driving direction.

7. The food cutting device as claimed in claim 6, including a spring member, wherein the clutch comprises two gear members having respective teeth interengaged under action of the spring member for simultaneous rotation to transmit the driving force to the cutter upon movement of the operating member in the driving direction, the teeth being skewed for disengagement against the action of the spring member to interrupt application of the driving force to the cutter, upon movement of the operating member in the non-driving direction.

8. The food cutting device as claimed in claim 1, wherein the driving mechanism includes a train of gears for transmitting a driving force and providing a speed reduction to increase torque transmitted to the cutter.

9. A food cutting device for cutting food items into smaller pieces, comprising:
   a receptacle having an entrance through which food items can be introduced into the receptacle and an exit through which smaller pieces of the food items can be dispensed from the receptacle;
   a rotary cutter located in the receptacle for cutting the food items into the smaller pieces;
   a retainer retaining the cutter in the receptacle and including a spring-loaded latch actuable to remove the cutter from the receptacle;
   a handle connected with the receptacle, for holding and carrying of the food cutting device with only one hand of a user; and
   a driving mechanism located between the cutter and the handle for manual operation by the user to operate the cutter, including an operating member that is located at or adjacent to the handle for movement and operation by the one hand holding and carrying the food cutting device.

10. The food cutting device as claimed in claim 9, wherein the operating member is supported for movement in opposite directions.

11. The food cutting device as claimed in claim 10, wherein the operating member is hinged for pivotal movement in the opposite directions.

12. The food cutting device as claimed in claim 11, wherein the operating member is movable in a driving direction to cause the driving mechanism to operate the cutter, and in a non-driving direction, opposite to the driving direction, in which the driving mechanism skips the cutter.

13. The food cutting device as claimed in claim 12, wherein the operating member is movable towards the handle in the driving direction and outwardly from the handle in the non-driving direction.

14. The food cutting device as claimed in claim 12, including a spring resiliently biasing the operating member towards the non-driving direction.

15. The food cutting device as claimed in claim 12, wherein the driving mechanism includes a one-way clutch for transmitting a driving force to the cutter upon movement of the operating member in the driving direction and interrupting transmission of the driving force to the cutter, upon movement of the operating member in the non-driving direction.

16. The food cutting device as claimed in claim 15, including a spring member, wherein the clutch comprises two gear members having respective teeth interengaged under action of the spring member for simultaneous rotation to transmit the driving force to the cutter upon movement of the operating member in the driving direction, the teeth being skewed for disengagement against the action of the spring member to interrupt application of the driving force to the cutter upon movement of the operating member in the non-driving direction.

\* \* \* \* \*